US006130780A

United States Patent [19]

[11] Patent Number: 6,130,780

[45] Date of Patent: Oct. 10, 2000

Joannopoulos et al.

[54] HIGH OMNIDIRECTIONAL REFLECTOR

[75] Inventors: John D. Joannopoulos, Belmont; Shanhui Fan; Joshua N. Winn, both of Somerville; Yoel Fink, Cambridge, all of Mass.

[73] Assignee: Massachusetts Institute of Technology, Cambridge, Mass.

[21] Appl. No.: 09/253,379

[22] Filed: Feb. 19, 1999

Related U.S. Application Data

[60] Provisional application No. 60/075,223, Feb. 19, 1998.

[51] Int. Cl.[7] ................................ F21V 9/04; G02B 1/10

[52] U.S. Cl. ............................................ 359/584; 359/359

[58] Field of Search ..................................... 359/584, 359

[56] References Cited

U.S. PATENT DOCUMENTS

| | | | |
|---|---|---|---|
| 5,194,989 | 3/1993 | Ferrante et al. | 359/583 |
| 5,214,530 | 5/1993 | Coombs et al. | 359/359 |
| 5,333,090 | 7/1994 | Baumeister et al. | 359/584 |
| 5,400,179 | 3/1995 | Ito | 359/359 |
| 5,740,287 | 4/1998 | Scalora et al. | 359/244 |
| 5,850,309 | 12/1998 | Shrai et al. | 359/584 |

FOREIGN PATENT DOCUMENTS

| | | |
|---|---|---|
| 1230329 | 4/1971 | United Kingdom . |

OTHER PUBLICATIONS

Baumeister, P. "The transmission and degree of polarization of quarterwave stacks at non–normal incidence." Optica Acta 8, 105–119 (1961).

Shellan, J. B. "Design of optimum high–reflectivity coatings for grazing angles of incidence." J. Opt. Soc. Am. A 2, 1057–1065 (1985).

Popov, K. V. et al. "Broadband high–reflection multilayer coatings at oblique angles of incidence." Applied Optics 36, 2139–2151 (1997).

*Primary Examiner*—Cassandra Spyrou

*Assistant Examiner*—Jennifer Winstedt

*Attorney, Agent, or Firm*—Samuels, Gauthier & Stevens, LLP

[57] ABSTRACT

A reflector, a method of producing same and a method of creating high omnidirectional reflection for a predetermined range of frequencies of incident electromagnetic energy for any angle of incidence and any polarization. The reflector includes a structure with a surface and a refractive index variation along the direction perpendicular to the surface while remaining nearly uniform along the surface. The structure is configured such that i) a range of frequencies exists defining a photonic band gap for electromagnetic energy incident along the perpendicular direction of said surface, ii) a range of frequencies exists defining a photonic band gap for electromagnetic energy incident along a direction approximately 90° from the perpendicular direction of said surface, and iii) a range of frequencies exists which is common to both of said photonic band gaps. In an exemplary embodiment, the reflector is configured as a photonic crystal.

44 Claims, 6 Drawing Sheets

HIGH OMNIDIRECTIONAL REFLECTOR

PRIORITY INFORMATION

This application claims priority from provisional application Ser. No. 60/075,223 filed Feb. 19, 1998.

SPONSORSHIP INFORMATION

This invention was made with government support under 9400334-DRM awarded by the National Science Foundation. The government has certain rights in the invention.

BACKGROUND OF THE INVENTION

The invention relates to the field of photonic crystals, and in particular to a dielectric high omnidirectional reflector.

Low-loss periodic dielectrics, or "photonic crystals", allow the propagation of electromagnetic energy, e.g., light, to be controlled in otherwise difficult or impossible ways. The existence of photonic bandgap in certain photonic crystals has given rise to the possibility that a photonic crystal can be a perfect mirror for light from any direction, with any polarization, within a specified frequency range. Within the frequency range of photonic bandgaps, there are no propagating solutions of Maxwell's equations inside a periodic medium. Consequently, a wave-front with a frequency within the gap which is incident upon the surface of such a crystal would be completely reflected.

It is natural to assume that a necessary condition for such omnidirectional reflection is that the photonic crystal exhibit a complete three-dimensional photonic band-gap, i.e., a frequency range within which there are no propagating solutions of Maxwell's equations. Such a photonic crystal would require periodic variations in dielectric constant in all three dimensions. These crystals, if designed for infrared or optical light, are difficult to fabricate, since the spatial periods must be comparable to the wavelength of operation. This is the reason why, despite heroic experiments involving advanced lithographic methods or self-assembling microstructures, most of the proposals for utilizing photonic crystals are in early stages of development.

SUMMARY OF THE INVENTION

It is therefore an object of the invention to provide a dielectric structure that acts as a perfect mirror by exhibiting high omnidirectional reflection of energy regardless of polarization and incident angle.

It is a further object of the invention to provide a one-dimensionally periodic photonic crystal structure, such as multi-layer films, that can exhibit complete reflection of radiation in a given frequency range for all incident angles and polarizations.

Accordingly, the invention provides a reflector, a method of producing same and a method of creating high omnidirectional reflection for a predetermined range of frequencies of incident electromagnetic energy for any angle of incidence and any polarization. The reflector includes a structure with a surface and a refractive index variation along the direction perpendicular to the surface while remaining nearly uniform along the surface. The structure is configured such that i) a range of frequencies exists defining a photonic band gap for electromagnetic energy incident along the perpendicular direction of said surface, ii) a range of frequencies exists defining a photonic band gap for electromagnetic energy incident along a direction approximately 90° from the perpendicular direction of said surface, and iii) a range of frequencies exists which is common to both of said photonic band gaps. In one exemplary embodiment the reflector is configured as a photonic crystal.

DETAILED DESCRIPTION OF THE INVENTION

Figure 1:
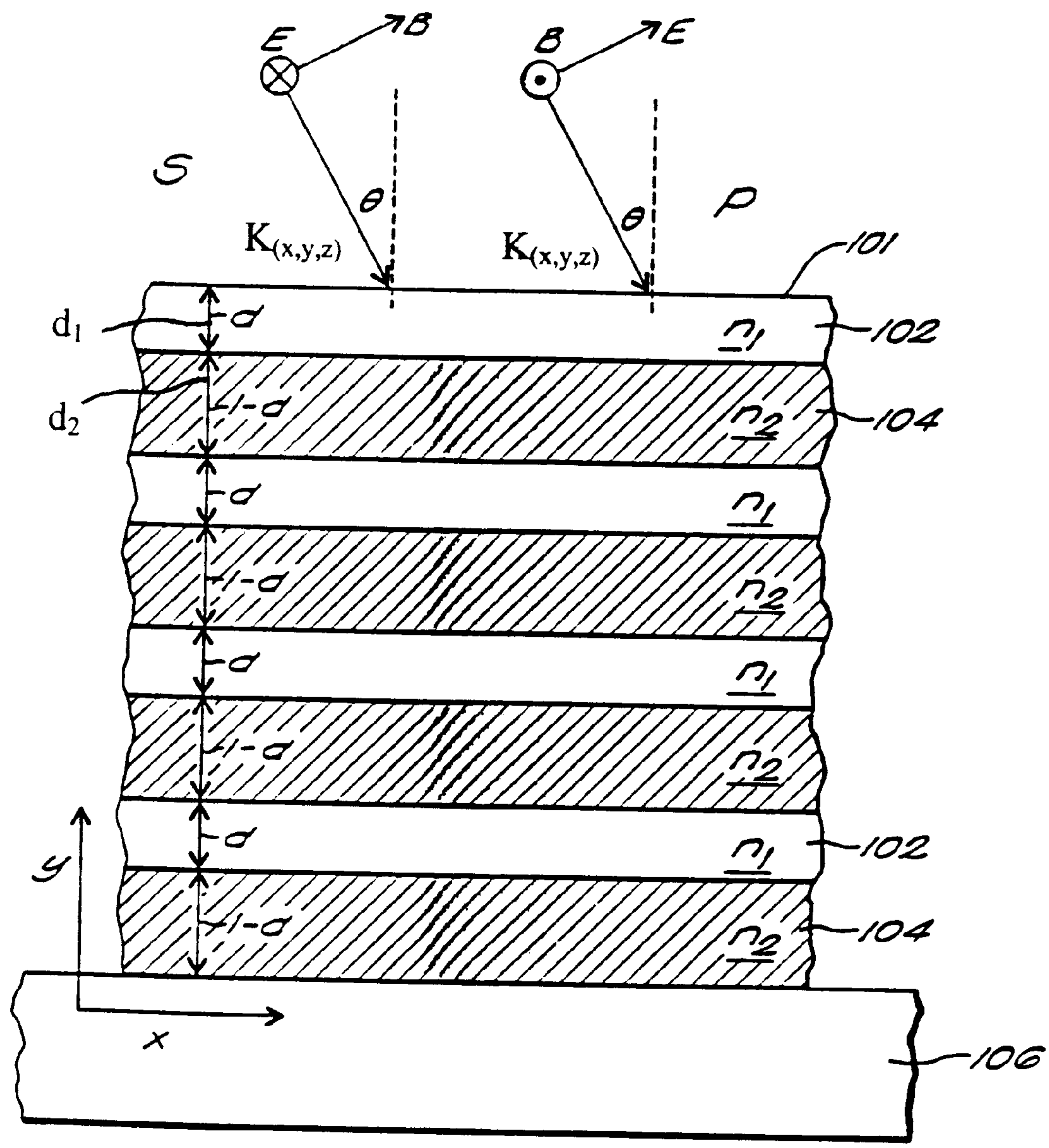
FIG. 1 is a schematic block diagram of an exemplary embodiment of a high omnidirectional reflector in accordance with the invention.

FIG. 1 is a schematic block diagram of an exemplary embodiment of a high omnidirectional reflector 100 in accordance with the invention. The reflector 100 is a one-dimensionally periodic photonic crystal having an index of refraction that is periodic in the y-coordinate, perpendicular to a surface 101, and consists of a repeating stack of dielectric slabs 102, 104, which alternate in thickness from $d_1$ to $d_2$ (in the illustrated embodiment $d_1=d$; and an index of refraction from $n_1$, to $n_2$. In the illustrated embodiment, $D_1$ and $d_2$ are assumed to be in the unit of period a. Only a few periods of such a periodic system are illustrated. For a quarter-wave stack, $n_1d_1=n_2d_2$. The stacks are fabricated in a conventional manner on a substrate 106, e.g., silicon.

FIG. 1 also shows two orthogonal polarizations of incident light. An s-polarized wave has an electric field E perpendicular to the plane of incidence and a magnetic field B parallel to the plane of incidence. A p-polarized wave has an electric field parallel to the plane of incidence and a magnetic field perpendicular to the plane of incidence. Since the medium is periodic in the y-direction (discrete translational symmetry) and homogeneous in the x- and z-directions (continuous translational symmetry), the electromagnetic modes can be characterized in Bloch form by a wave vector k. In particular, $k_y$ is restricted to the first Brillouin zone $-\pi/a<k_y<\pi/a$, and $k_x$ and $k_z$ are unrestricted. One can suppose that $k_z=0$, $k_x\geqq 0$ and $n_2>n_1$ without loss of generality. The allowed mode frequencies $\omega_n$ for each choice of k constitute the band structure of the crystal. The continuous functions $\omega_n(k)$, for each n, are the photonic bands.

Figure 2:
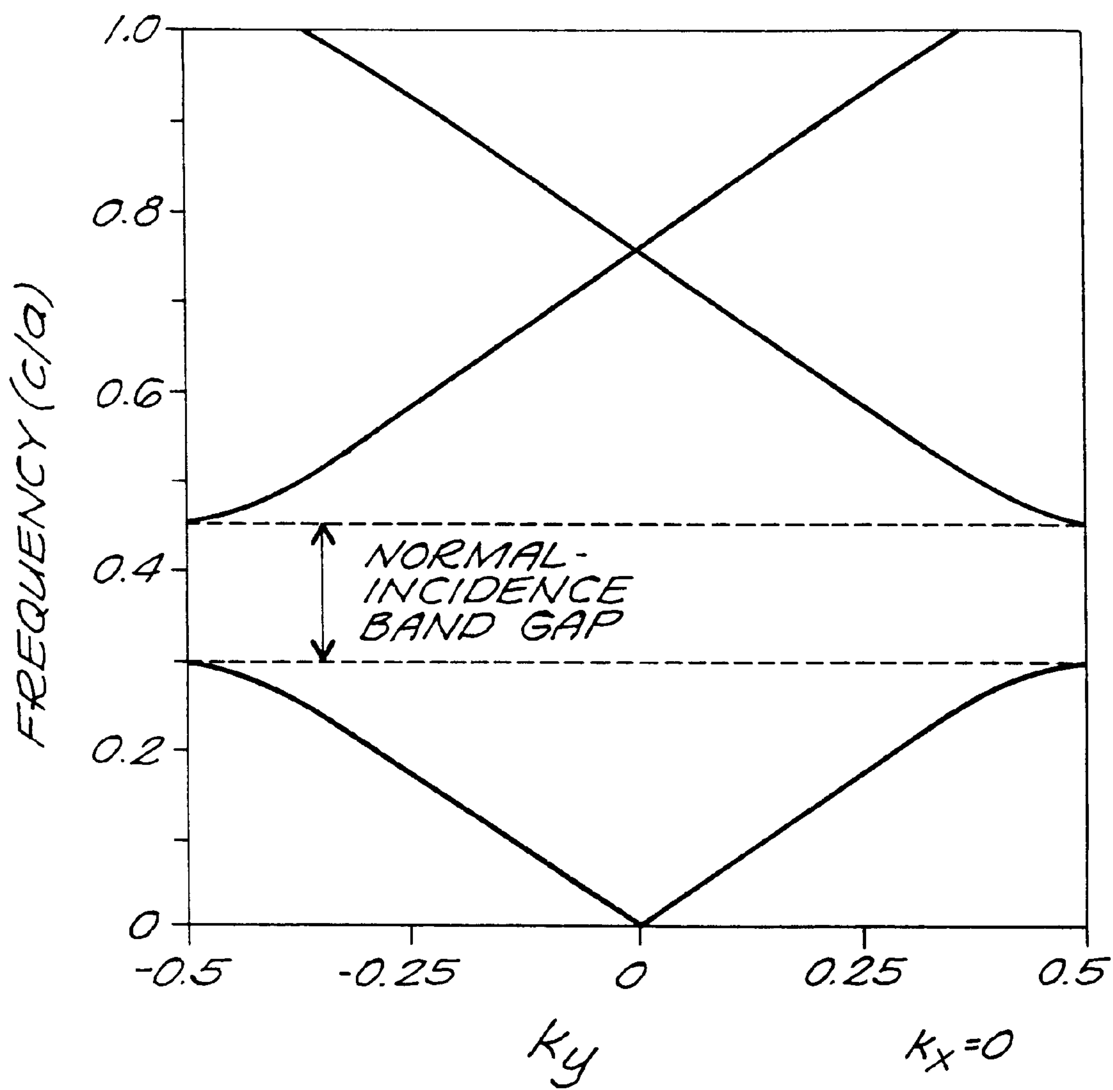
FIG. 2 is a graph of the first three bands of an exemplary multilayer film quarter-wave stack.

FIG. 2 is a graph of the first three bands of an exemplary multilayer film quarter-wave stack with $n_1=1$, $n_2=2$, as a function of $k_y$, for the special case $k_x=0$ (normal incidence). The thickness were chosen to be $d_1=0.67$ and $d_2=0.33$. For $k_x=0$, there is no distinction between s- and p-polarized waves. There is a wide frequency gap between the first and second bands. This splitting arises from the destructive interference of the waves which are transmitted and reflected at each interface. It will be appreciated that the frequency has been expressed in units of c/a, where c is the speed of light in the ambient medium and $a=d_1+d_2$.

Any one-dimensional photonic crystal, as defined by a varying index function n(y) that in the illustrated case is periodic will have a non-zero gap for $k_x=0$. Within it there are no propagating modes, so a wave with its frequency falling in the range of the gap, if incident normal to the surface of such a crystal, will be reflected.

Figure 3:
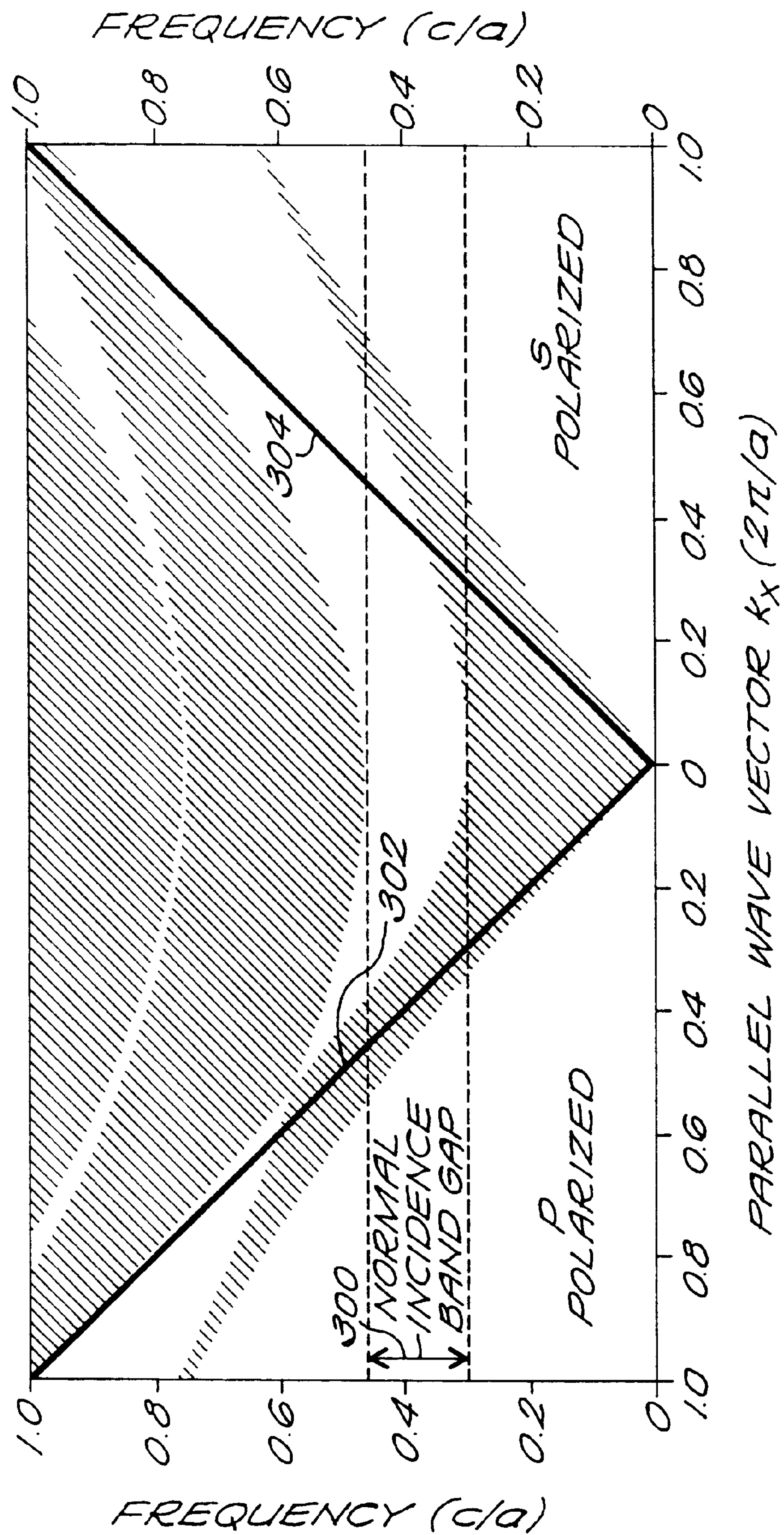
FIG. 3 is a graph showing the projected band structure for a quarter-wave stack with $n_1=1$, $n_2=2$.

For $k_x>0$ (an arbitrary direction of propagation) it is convenient to examine the projected band structure, which is shown in FIG. 3 for the same medium as in FIG. 2, a quarter-wave stack with $n_1=1$, $n_2=2$. To make this plot, first the bands $\omega_n(k_x, k_y)$ for the structure were computed, using a numerical method for solving Maxwell's equations in a periodic medium. For each value of $k_x$, the mode frequencies $\omega_n$ for all possible values of $k_y$ were plotted. Thus, in the gray regions there are electromagnetic modes for some values of $k_y$, whereas in the white regions there are no electromagnetic modes, regardless of $k_y$. The s-polarized modes are plotted to the right of the origin, and the p-polarized modes to the left. Frequencies are reported in units of c/a.

The shape of the projected band structure for a multilayer film can be understood intuitively. At $k_x=0$, the normal-incidence bandgap of FIG. 2 is recovered. This range of frequencies is enclosed by dashed lines. As $k_x>0$, the bands curve upwards in frequency, as the condition for destructive interference shifts to shorter wavelengths. As $k_x\rightarrow\infty$, the frequency width of the gray regions shrinks until they become lines. In this regime the modes are largely confined to the slabs with the higher index of refraction. For large $k_x$ they are very well confined and do not couple between layers (independent of $k_y$). They are approximately planar waveguide modes, so the dispersion relation approaches $\omega=ck_x/n_2$ asymptotically.

One obvious feature of FIG. 3 is that there is no complete bandgap. For any frequency, there exists a wave-vector and an associated electromagnetic mode corresponding to that frequency. The normal-incidence bandgap 300 (enclosed by the dashed lines) is crossed by modes with $k_x>0$. This is a general feature of one-dimensional photonic crystals.

However, the absence of a complete band-gap does not preclude omnidirectional reflection. The criterion is not that there be no propagating states within the crystal; rather, the criterion is that there be no propagating states that may couple to an incident propagating wave. This is equivalent to the existence of a frequency range in which the projected band structures of the crystal and the ambient medium have no overlap.

The two diagonal black lines 302, 304 in FIG. 3 are the "light lines" $\omega=ck_x$. The electromagnetic modes in the ambient medium (air) obey $\omega=c(k_x^2+k_y^2)^{1/2}$, where c is the speed of light in the ambient medium, so generally $\omega>ck_x$. The whole region above the solid diagonal "light-lines" $\omega>ck_x$ is filled with the projected bands of the ambient medium.

For a semi-infinite crystal occupying $y<0$ and an ambient medium occupying $y>0$, the system is no longer periodic in the y-direction (no translational symmetry) and the electromagnetic modes of the system can no longer be classified by a single value of $k_y$. They must be written as a weighted sum of plane waves with all possible $k_y$. However, $k_x$ is still a valid symmetry label. The angle of incidence $\theta$ upon the interface at $y=0$ is related to $k_x$ by $\omega\sin\theta=ck_x$.

For there to be any transmission through the semi-infinite crystal at a particular frequency, there must be an electromagnetic mode available at that frequency which is extended for both $y>0$ and $y<0$ Such a mode must be present in the projected photonic band structures of both the crystal and the ambient medium. The only states that could be present in the semi-infinite system that were not present in the bulk system are surface states, which decay exponentially in both directions away from the surface, and are therefore irrelevant to the transmission of an external wave. Therefore, the criterion for high omnidirectional reflection is that there are no states in common between the projected bands of the ambient medium and those of the crystal, i.e., there exists a frequency zone in which the projected bands of the crystal have no states with $\omega>ck_x$.

It can be seen from FIG. 3 that there is such a frequency zone (0.36 c/a to 0.45 c/a) for s-polarized waves. The zone is bounded above by the normal-incidence bandgap, and below by the intersection of the top of the first gray region with the light line. The top edge of the first gray region is the dispersion relation for states with $k_y=\pi/a$.

The lowest two p-bands cross at a point above the line $\omega=ck_x$, preventing the existence of such a frequency zone. This crossing occurs at the Brewster angle $\theta_B=\tan^{-1}(n_2/n_1)$, at which there is no reflection of p-polarized waves at any interface. At this angle there is no coupling between waves with $k_y$ and $-k_y$, a fact which permits the band-crossing to occur. As a result, the bands curve upwards more rapidly.

This difficulty vanishes when the bands of the crystal are lowered relative to those of the ambient medium, by raising the indices of refraction of the dielectric films. For example, by multiplying the index of refraction n(y) by a constant factor $\alpha>1$, all of the frequencies of the electromagnetic modes are lowered by the same factor $\alpha$.

Figure 4:
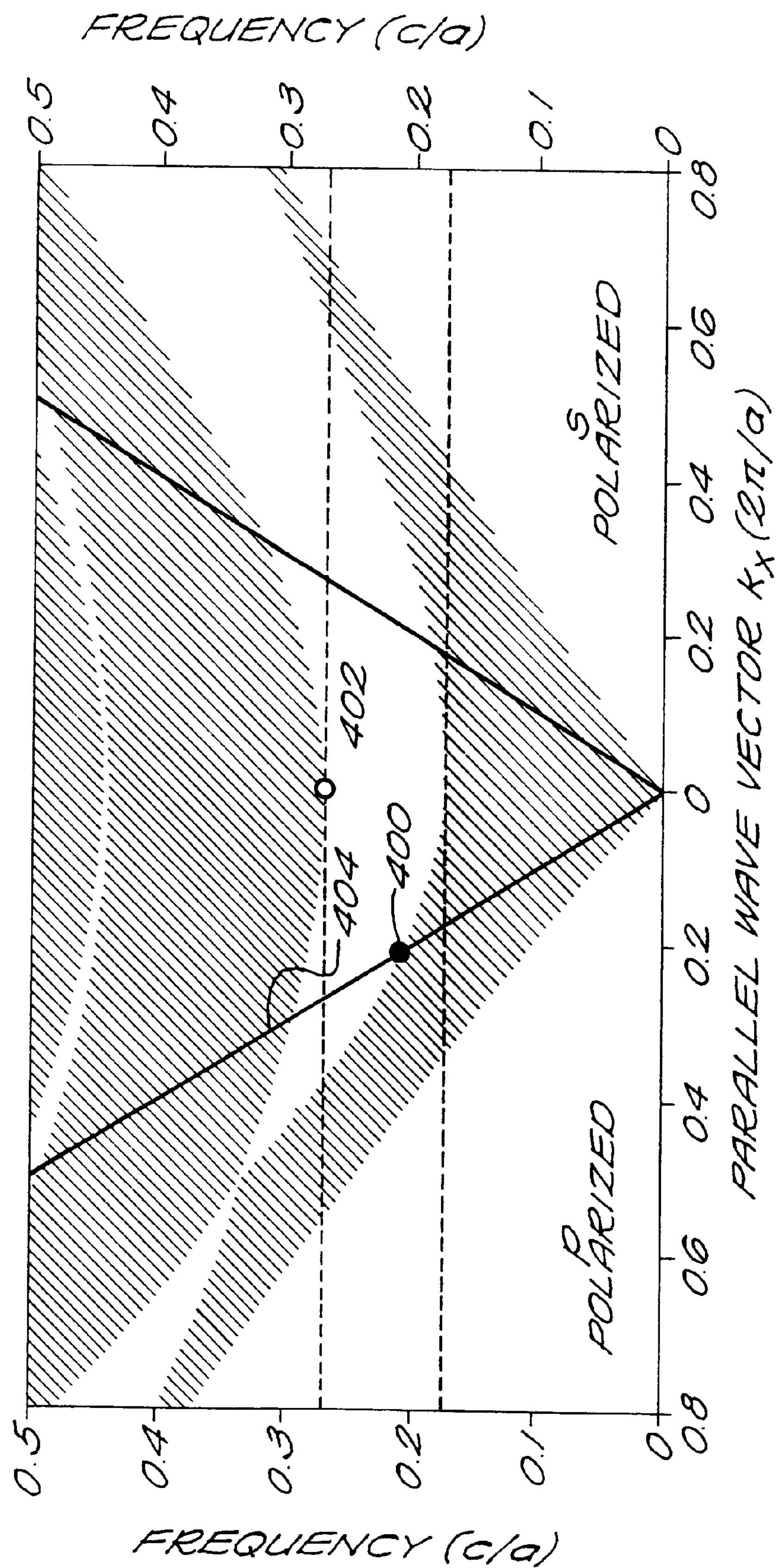
FIG. 4 is a graph showing the projected band structure for a quarter-wave stack with the same ratio $n_2/n_1=2$ and $n_1=1.7$, $n_2=3.4$ ($\alpha=1.7$), and $d_1=0.67a$, $d_2=0.33a$, where a is the period.

FIG. 4 is a graph showing the projected band structure for an exemplary quarter-wave stack with the same ratio $n_2/n_1=2$ and $n_1=1.7$, $n_2=3.4$ ($\alpha=1.7$), and $d_1=0.67$, $d_2=0.33$. In this case there is a frequency zone in which the projected bands of the crystal and ambient medium do not overlap, namely from the point 400 ($\omega a/2\pi c=0.21$) to the point 402 ($\omega a/2\pi c=0.27$). This zone is bounded above by the normal-incidence bandgap and below by the intersection of the top of the first gray region for p-polarized waves with the light-line 404. While the illustrated embodiments of the invention will be described utilizing a silicon—silicon dioxide materials system, the invention can be fabricated with other materials systems.

Between the frequencies corresponding to the points 400 and 402, there will be total reflection from any incident angle for either polarization. For a finite number of films, the transmitted light will diminish exponentially with the number of films. The calculated transmission spectra, for a finite system of ten films (five periods), are plotted in FIG. 5 for various angles of incidence, e.g., from 0° to approximately 90°. The calculations were performed using transfer matrices. The stop band shifts to higher frequencies with more oblique angles, but there is a region of overlap which remains intact for all angles.

Figure 5A:
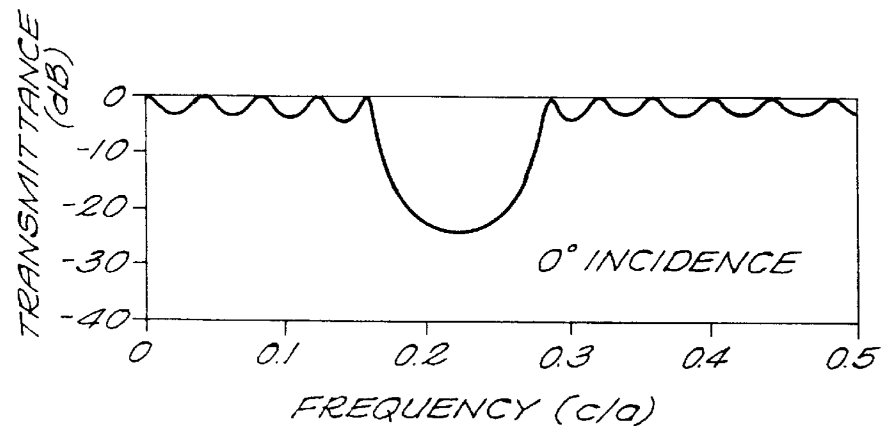
FIG. 5 is a graph of the calculated spectra for a quarter-wave stack of ten films ($n_1=1.7$, $n_2=3.4$) for three angles of incidence.
Figure 5B:
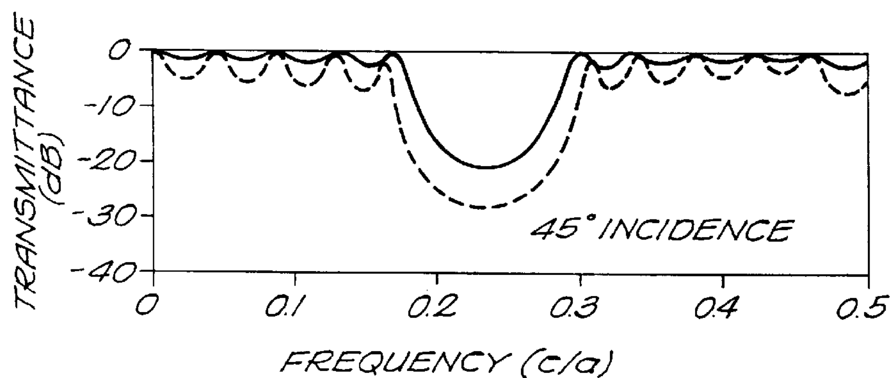
Figure 5C:
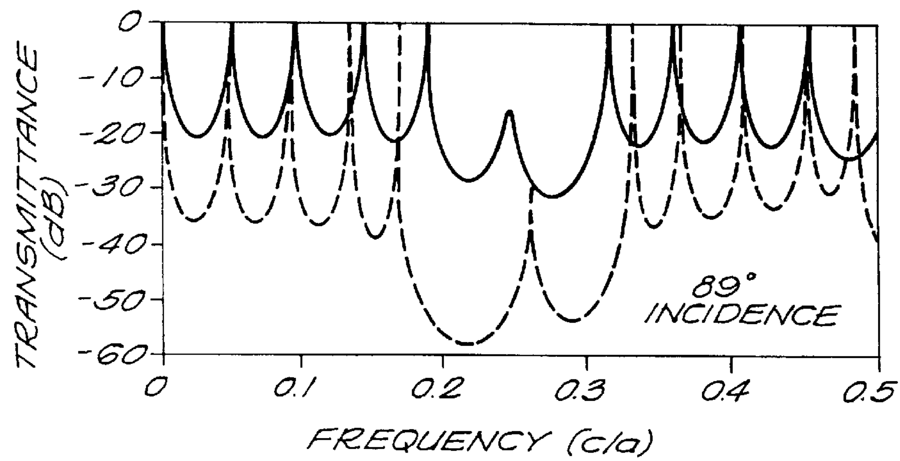

FIG. 5 is a graph of the calculated spectra for a quarter-wave stack of ten films (n1=1.7, n2=3.4) for three angles of incidence. The solid curves correspond to p-polarized waves, and the dashed curves correspond to s-polarized waves. The overlapping region of high reflectance corresponds to the region between the points 400 and 402 of FIG. 4. While the illustrated embodiment describes the characteristics of a structure having a ten-layer film of silicon and silicon dioxide, it will be appreciated that a reflector of the invention can be achieved with other multilayer arrangements or other material systems with appropriate index contrasts.

The criterion for high omnidirectional reflection (the non-overlap of the projected bands of both crystal and ambient medium) applies for a general function n(y) that is not necessarily periodic. For the special case of a multilayer film it is possible to derive an explicit form of the band structure function $\omega_n(k_x,k_y)$ and use it to investigate systematically the frequency zone of directional reflection, if any, which results from a given choice of $n_1$, $n_2$, $d_1$ and $d_2$.

The graphical criterion for high omnidirectional reflection, as shown in FIG. 4, is that the point 400 (the intersection of the light line 404 and the first p-polarized band at $k_y=\pi/a$) be lower than the point 402 (the second band at $k_x=0$, $k_y=\pi/a$). Symbolically, $$\omega_{p1}\left(k_x=\frac{\omega_{p1}}{c},\ k_y=\frac{\pi}{a}\right)<\omega_{p2}\left(k_x=0,\ k_y=\frac{\pi}{a}\right) \tag{1}$$

where $\omega_{pn}(k_x,k_y)$ is the p-polarized band structure function for the multilayer film. It will be appreciated that the left side is a self-consistent solution for the frequency $\omega_{p1}$. The difference between these two frequencies is the range of high omnidirectional reflection.

For a multilayer film, the dispersion relation $\omega_n(k_x,k_y)$ may be derived by computing the eigenvalues $\Lambda$ of the transfer matrix associated with one period of the film at a particular frequency and incident angle. When $\Lambda=\exp(ik_ya)$ with $k_y$ real, there is a propagating mode at that frequency and angle. The dispersion relation $\omega_n(k_x,k_y)$ is governed by the transcendental equation:

$$\left(1+\frac{A}{2}\right)\cos[(\beta_2+\beta_1)\omega]-\frac{A}{2}\cos[(\beta_2-\beta_1)\omega]=\cos(k_ya) \tag{2}$$

Here $$\beta_{1,2}=(d_{1,2}/c)\sqrt{n_{1,2}^2-\sin^2\theta}$$

$\sqrt{n_{1,2}^2-\sin^2\theta}$ is defined for each film. The polarization-dependent constant A is defined by:

$$A=\frac{(r_1-r_2)^2}{2r_1r_2} \tag{3}$$

$$r_{1,2}=\left\{\begin{array}{ll}\sqrt{n_{1,2}^2-\sin^2\theta} & \text{(s-polarized)}\\ \dfrac{n_{1,2}}{\sqrt{n_{1,2}^2-\sin^2\theta}} & \text{(p-polarized)}\end{array}\right\} \tag{4}$$

These results may be used to evaluate the criterion as expressed in equation (1). The roots of equation (2) may be found numerically, for a given $k_y$ and $\theta=\text{asin}(ck_x/\omega)$. The frequency range (if any) of omidirectional reflection, according to equation (1), is between the first root of equation (2) for p-polarized waves with $k_y=\pi/a$ and $\theta=\pi/2$ (point 400 of FIG. 4), and the second root for $k_y=\pi/a$ and $\theta=0$ (point 402).

The frequency range has been calculated (when it exists) for a comprehensive set of film parameters. Since all the mode wavelengths scale linearly with $d_1+d_2=a$, only three parameters need to be considered for a multilayer film: $n_1$, $n_2$, and $d_1/a$. To quantify the range of high omnidirectional reflection $[\omega_1,\omega_2]$ in a scale-independent manner, the "range-midrange ratio" is defined as $(\omega_2-\omega_1)/[(½)(\omega_1+\omega_2)]$.

Figure 6:
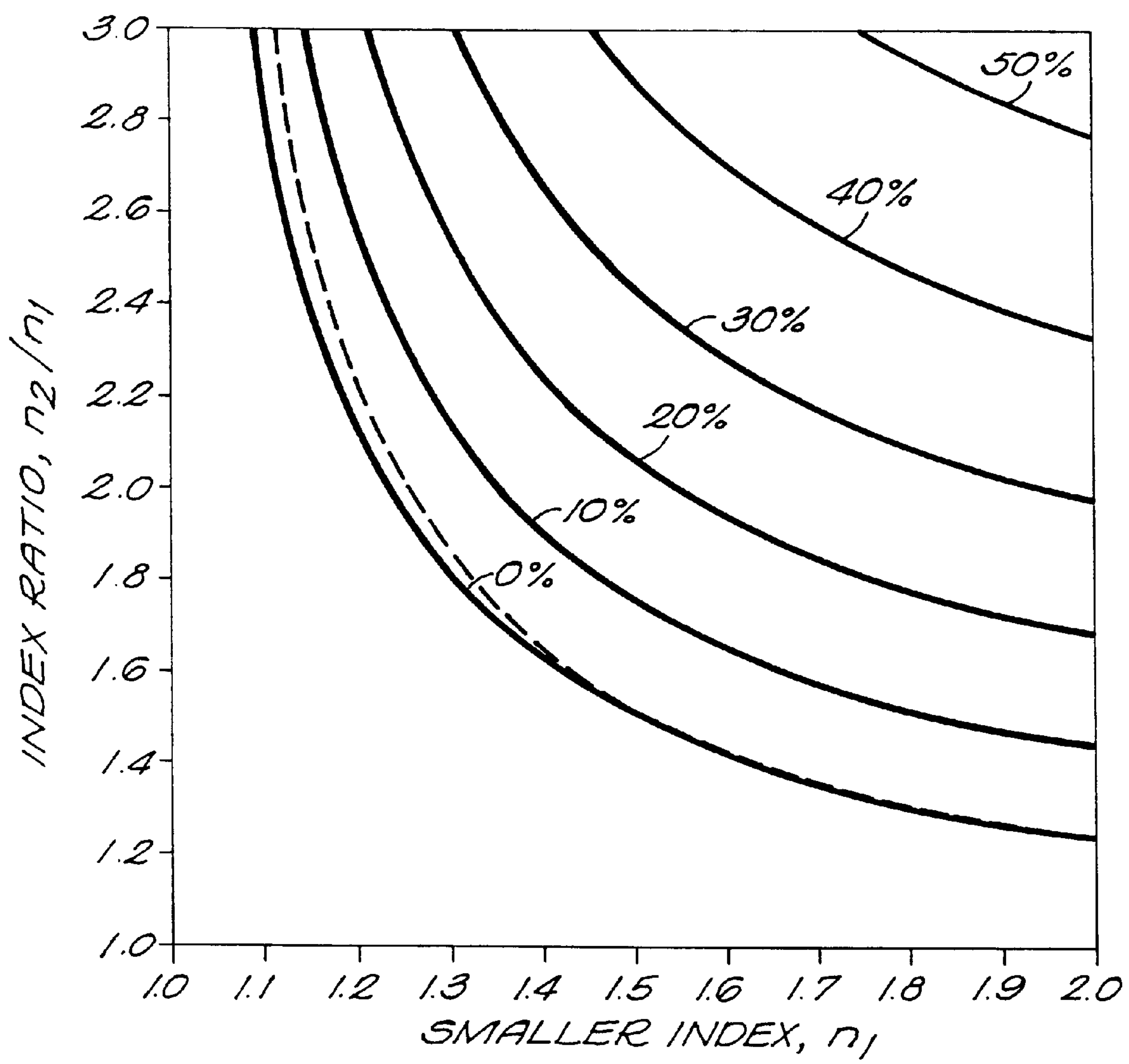
FIG. 6 is a contour plot of the range-midrange ratio for the frequency range of high omnidirectional reflection, as $n_1$ and $n_2/n_1$ are varied, for the maximizing value of $d_1/a$.

For each choice of $n_1$ and $n_2/n_1$, there is a value of $d_1/a$ that maximizes the range-midrange ratio. That choice may be computed numerically. FIG. 6 is a contour plot of the range-midrange ratio for the frequency range of high omnidirectional reflection, as $n_1$ and $n_2/n_1$ are varied, for the maximizing value of $d_1/a$ (solid contours). The dashed curve is the 0% contour for the case of a quarter-wave stack. For the general case of an ambient medium with index $n_0\approx1$, the abscissa becomes $n_1/n_0$. This plot shows the largest possible range-midrange ratio achievable with $n_1$ and $n_2$ fixed.

An approximate analytic expression for the optimal zone of high omnidirectional reflection may be derived:

$$\frac{\Delta\omega}{2c}=\frac{\text{acos}\left(-\sqrt{\dfrac{A-2}{A+2}}\right)}{d_1n_1+d_2n_2}-\frac{\text{acos}\left(-\sqrt{\dfrac{B-2}{B+2}}\right)}{d_1\sqrt{n_1^2-1}+d_2\sqrt{n_2^2-1}} \tag{5}$$

where $$A\equiv\frac{n_2}{n_1}+\frac{n_1}{n_2},\ B\equiv\frac{n_2\sqrt{n_1^2-1}}{n_1\sqrt{n_2^2-1}}+\frac{n_1\sqrt{n_2^2-1}}{n_2\sqrt{n_1^2-1}} \tag{6}$$

Numerically this is found to be an excellent approximation for the entire range of parameters depicted in FIG. 6 including the case of a quarter-wave stack.

It can be seen from FIG. 6 that, for high omnidirectional reflection, the index ratio should be reasonably high ($n_1/n_2>1.5$) and the indices themselves be somewhat higher ($n_1/n_0\geqq1.5$) than that of the ambient medium. The former condition increases the band splittings, and the latter depresses the frequency of the Brewster crossing. An increase in either factor can partially compensate for the other. The materials should also have a long absorption length for the frequency range of interest, especially at grazing angles, where the path length of the reflected light along the crystal surface is long.

For example, for light with a wavelength of 1.5 $\mu$m, silicon dioxide has $n_1=1.44$ and silicon has $n_2=3.48=2.42n_1$. From FIG. 6, this corresponds to a range-midrange ratio of about 27%. Likewise, for $GaAs/Al_2O_3$ multilayers ($n_1=1.75$, $n_2=3.37=1.93n_1$), the range-midrange ratio is about 24%.

In practice, the optimization of $d_1/a$ results in a gap size very close to the gap size that would result from a quarter-wave stacked with the same indices $d_1/a=n_2/(n_2+n_1)$. The 0% contour for quarter-wave stacks is plotted in FIG. 6 as a dashed line, which is very close to the With this in mind, an approximation to equation (2) may be derived for films which are nearly quarter-wave stacks. In that limit $\beta_2-\beta_1\approx0$, so the second cosine in equation (2) is approximately 1. In this approximation the frequency of the band edge at $ky=\pi/a$ is:

$$\omega\approx\frac{1}{\beta_1+\beta_2}\text{acos}\left[\frac{\frac{A}{2}+1}{\frac{A}{2}-1}\right] \tag{7}$$

using the same notion as in equations (3) and (4). This frequency can be computed for the cases $\theta=0$ and $\theta=\pi/2$. If the difference between these two frequencies is positive, there will be omnidirectional reflection for any frequency between them.

The invention demonstrates that, even though it is not possible for a one-dimensional photonic crystal to have a complete bandgap, it is still possible to achieve reflection of ambient light regardless of incident angle or polarization. This happens whenever the projected bands of the crystal and ambient medium have no overlap within some range of frequencies.

This constraint is not unrealistic, even for the most common sort of one-dimensional photonic crystal, the multilayer film. As can be seen in FIG. 6, what is required is that the index ratio be reasonably high ($n_2/n_1>1.5$) and the indices themselves be somewhat higher than that of the ambient medium ($n_1/n_0>1.5$). An increase in either factor can partially compensate for the other. They should also have a relatively long absorption length for the frequency range of interest. Such materials, and the technology required to deposit them in multiple layers, are conventional. To achieve high omnidirectional reflection, therefore, it is not necessary to use more elaborate systems such as multiple interleaving stacks, materials with special dispersion properties, or fully three-dimensional photonic crystals.

The optical response of a particular dielectric multilayer film can be predicted using the characteristic matrix method. In this method, a 2×2 unitary matrix is constructed for each layer. This matrix represents a mapping of the field components from one side of the layer to the other. To successfully predict the optical response of a multilayer film the characteristic matrix for each layer needs to be calculated. The form of the characteristic matrix for the $j^{th}$ layer is $$m^g(\theta)_j = \begin{bmatrix} \cos\beta_j & -\frac{i}{p_j^g}\sin\beta_j \\ -ip_j^g\sin\beta_j & \cos\beta_j \end{bmatrix} \quad (g = TE, TM) \tag{8}$$

$$\beta_j = kh_j\sqrt{n_j^2 - snell(\theta)^2}$$

$$snell(\theta) = n_0\sin\theta_0$$

$$p_j^g = \begin{cases} \sqrt{n_j^2 - snell(\theta)^2} & g = TE \\ \dfrac{\sqrt{n_j^2 - snell(\theta)^2}}{n_j^2} & g = TM \end{cases}$$

where $n_j$ is the index of refraction, and $h_j$ is the thickness of the $j^{th}$ layer, $\theta_0$ is the angle between the incident wave and the normal to the surface and $n_0$ is the index of the initial medium (e.g. air).

The matrices are then multiplied to give the film's characteristic matrix $$M^g(\theta) = \prod_{j=1}^{N} m_j^g \quad (g = TM \text{ or } TE) \tag{9}$$

which in turn can be used to calculate the reflectivity for a given polarization and angle of incidence, $$R^g(\theta) = \left| \frac{(M_{11}^g(\theta) + M_{12}^g(\theta)p_1^g)p_0^g - (M_{21}^g(\theta) + M_{22}^g(\theta)p_1^g)}{(M_{11}^g(\theta) + M_{12}^g(\theta)p_1^g)p_0^g + (M_{21}^g(\theta) + M_{22}^g(\theta)p_1^g)} \right|^2 \tag{10}$$

where $p^g_0$ contains information about the index of the medium and angle of incidence on one side of the multilayer film and $p^g_1$ contains information about the index of the medium and angle of incidence on the other.

To construct a reflector exhibiting a reflectivity R of a minimal prescribed value for all angles of incidence and both polarizations one needs to (1) satisfy the criteria for omnidirectional reflection, and (2) solve equation (10) for θ=89.9°, g=TM and R™M(89.9)=R.

Although the invention has been illustrated by using multilayered films, the invention as described can apply generally to any periodic dielectric function n(y), or even an aperiodic dielectric function n(y). What is required is that n(y) leads to photonic bandgaps along various directions such that there exists a zone of frequencies in which the projected bands of the dielectric structure and ambient media do not overlap. Such a requirement can also be satisfied by a photonic crystal with two- or three-dimensionally periodic index contrasts, which have incomplete bandgaps.

However, the absence of a complete bandgap does have physical consequences. In the frequency range of high omnidirectional reflection, there exist propagating solutions of Maxwell's equations, but they are states with $\omega<ck_x$, and decrease exponentially away from the crystal boundary. If such a state were launched from within the crystal, it would propagate to the boundary and reflect, just as in total internal reflection.

Likewise, although it might be arranged that the propagating states of the ambient medium do not couple to the propagating states of the crystal, any evanescent states in the ambient medium will couple to them. For this reason, a point source of waves placed very close ($d<\lambda$) to the crystal surface could indeed couple to the propagating state of the crystal. Such restrictions, however, apply only to a point source and can be easily overcome by simply adding a low index cladding layer to separate the point source from the film surface.

Many potential applications are envisioned for such a high omnidirectional reflector or mirror. For example, in the infrared, visible, or ultraviolet regimes, high omnidirectional reflectors could serve as a frequency-selective mirrors for laser beams or highly-reflective coatings on focusing instruments. These would be effective for light that is incident from any angle, instead of just a finite range around a fixed design angle.

The invention can also be utilized in coatings with infrared mirrors to keep heat in or out of the items coated, e.g., walls, windows, clothes, etc. The mirrors can be cut into small flakes and mixed with paint or fabrics to allow for application to the desired items.

The reflector of the invention could be used in improving thermo-photovoltaic cells that trap waste heat and convert it into energy. The reflector of the invention can also be made to reflect radio waves and thus can be used to boost performance of radio devices such as cellular telephones.

Although the present invention has been shown and described with respect to several preferred embodiments thereof, various changes, omissions and additions to the form and detail thereof, may be made therein, without departing from the spirit and scope of the invention.

What is claimed is:

1. A method of producing a reflector which exhibits high omnidirectional reflection for a predetermined range of frequencies of incident electromagnetic energy for any angle of incidence and any polarization, comprising:

configuring a structure with a surface and a refractive index variation along the direction perpendicular to said surface while remaining nearly uniform along the surface, said structure configured such that i) a range of frequencies exists defining a photonic band gap for electromagnetic energy incident along the perpendicular direction of said surface, ii) a range of frequencies exists defining a photonic band gap for electromagnetic energy incident along a direction approximately 90° from the perpendicular direction of said surface, and iii) a range of frequencies exists which is common to both of said photonic band gaps.

2. The method of claim 1, wherein in step iii) said range of frequencies comprises a range of maximum frequencies that exists in common to both of said photonic band gaps.

3. The method of claim 1, wherein ranges of frequencies exist defining photonic band gaps for electromagnetic energy incident along directions between 0° and approximately 90° from the perpendicular direction of said surface.

4. The method of claim 1, wherein said structure is configured as a photonic crystal.

5. The method of claim 4, wherein said structure is configured as a one dimensionally periodic dielectric structure.

6. The method of claim 5, wherein said periodic dielectric structure comprises periodic units each having two or more layers.

7. The method of claim 6, wherein said periodic units comprise layers of silicon and silicon dioxide.

8. The method of claim 6, wherein said periodic units comprise layers of GaAs and $Al_xO_y$.

9. The method of claim 6, wherein the range of frequencies for high omnidirectional reflection is $$\frac{\Delta\omega}{2c} = \frac{a\cos\left(-\sqrt{\frac{A-2}{A+2}}\right)}{d_1 n_1 + d_2 n_2} - \frac{a\cos\left(-\sqrt{\frac{B-2}{B+2}}\right)}{d_1\sqrt{n_1^2-1} + d_2\sqrt{n_2^2-1}} \qquad a = d_1 + d_2$$

where $$A \equiv \frac{n_2}{n_1} + \frac{n_1}{n_2},\ B \equiv \frac{n_2\sqrt{n_1^2-1}}{n_1\sqrt{n_2^2-1}} + \frac{n_1\sqrt{n_2^2-1}}{n_2\sqrt{n_1^2-1}}$$

and where $\Delta\omega$ is said range of frequencies, c is the speed of light in air, $n_1$ is the index of refraction of a first layer of said two layers, $d_1$ is the thickness of said first layer, $n_2$ is the index of refraction of a second layer of said two layers, $d_2$ is the thickness of said second layer and $a=d_1+d_2$.

10. The method of claim 6, wherein the layer thickness of materials of first and second layers with respective indices of refraction defined with respect to the ambient are chosen such that $\Delta\omega$ is greater than zero.

11. The method of claim 1, wherein said structure is configured with a continuous variation in refractive index.

12. The method of claim 1, wherein said structure is configured as an aperiodic dielectric structure.

13. The method of claim 1, wherein said reflector exhibits greater than 99% reflectivity.

14. A high omnidirectional reflector which exhibits reflection for a predetermined range of frequencies of incident electromagnetic energy for any angle of incidence and any polarization, comprising:

a structure with a surface and a refractive index variation along the direction perpendicular to said surface while remaining nearly uniform along the surface, said structure configured such that, i) a range of frequencies exists defining a photonic band gap for electromagnetic energy incident along the perpendicular direction of said surface, ii) a range of frequencies exists defining a photonic band gap for electromagnetic energy incident along a direction approximately 90° from the perpendicular direction of said surface, and iii) a range of frequencies exists which is common to both of said photonic band gaps.

15. The method of claim 14, wherein in step iii) said range of frequencies comprises a range of maximum frequencies that exists in common to both of said photonic band gaps.

16. The reflector of claim 14, wherein ranges of frequencies exist defining photonic band gaps for electromagnetic energy incident along directions between 0° and approximately 90° from the perpendicular direction of said surface.

17. The reflector of claim 14, wherein said structure is configured as a photonic crystal.

18. The reflector of claim 17, wherein said structure is configured as a one dimensionally periodic dielectric structure.

19. The reflector of claim 18, wherein said periodic dielectric structure comprises periodic units each having two or more layers.

20. The reflector of claim 19, wherein said periodic units comprise layers of silicon and silicon dioxide.

21. The reflector of claim 19, wherein said periodic units comprise layers of GaAs and $Al_xO_y$.

22. The method of claim 19, wherein the range of frequencies for high omnidirectional reflection is $$\frac{\Delta\omega}{2c} = \frac{a\cos\left(-\sqrt{\frac{A-2}{A+2}}\right)}{d_1 n_1 + d_2 n_2} - \frac{a\cos\left(-\sqrt{\frac{B-2}{B+2}}\right)}{d_1\sqrt{n_1^2-1} + d_2\sqrt{n_2^2-1}}$$

where $$A \equiv \frac{n_2}{n_1} + \frac{n_1}{n_2},\ B \equiv \frac{n_2\sqrt{n_1^2-1}}{n_1\sqrt{n_2^2-1}} + \frac{n_1\sqrt{n_2^2-1}}{n_2\sqrt{n_1^2-1}}$$

and where $\Delta\omega$ is said range of frequencies, c is the speed of light in air, $n_1$ is the index of refraction of a first layer of said two layers, $d_1$ is the thickness of said first layer, $n_2$ is the index of refraction of a second layer of said two layers, $d_2$ is the thickness of said second layer and $a=d_1+d_2$.

23. The reflector of claim 19, wherein the layer thickness of materials of first and second layers with respective indices of refraction defined with respect to the ambient are chosen such that $\Delta\omega$ is greater than zero.

24. The method of claim 14, wherein said structure is configured with a continuous variation in refractive index.

25. The method of claim 14, wherein said structure is configured as an aperiodic dielectric structure.

26. The method of claim 14, wherein said reflector exhibits greater than 99% reflectivity.

27. A method of creating high omnidirectional reflection for a predetermined range of frequencies of incident electromagnetic energy for any angle of incidence and any polarization, comprising:

providing a structure with a surface and a refractive index variation along the direction perpendicular to said surface while remaining nearly uniform along the surface, said structure configured such that i) a range of frequencies exists defining a photonic band gap for electromagnetic energy incident along the perpendicular direction of said surface, ii) a range of frequencies exists defining a photonic band gap for electromagnetic energy incident along a direction approximately 90° from the perpendicular direction of said surface, and iii) a range of frequencies exists which is common to both of said photonic band gaps.

28. The method of claim 27, wherein in step iii) said range of frequencies comprises a range of maximum frequencies that exists in common to both of said photonic band gaps.

29. The method of claim 27, wherein ranges of frequencies exist defining photonic band gaps for electromagnetic energy incident along directions between 0° and approximately 90° from the perpendicular direction of said surface.

30. The method of claim 27, wherein said structure is configured as a photonic crystal.

31. The method of claim 30, wherein said structure is configured as a one dimensionally periodic dielectric structure.

32. The method of claim 31, wherein said periodic dielectric structure comprises periodic units each having two or more layers.

33. The method of claim 32, wherein said periodic units comprise layers of silicon and silicon dioxide.

34. The method of claim 32, wherein said periodic units comprise layers of GaAs and $Al_xO_y$.

35. The method of claim 32, wherein the range of frequencies for high omnidirectional reflection is $$\frac{\Delta\omega}{2c} = \frac{acos\left(-\sqrt{\frac{A-2}{A+2}}\right)}{d_1 n_1 + d_2 n_2} - \frac{acos\left(-\sqrt{\frac{B-2}{B+2}}\right)}{d_1\sqrt{n_1^2-1} + d_2\sqrt{n_2^2-1}}$$

where $$A \equiv \frac{n_2}{n_1} + \frac{n_1}{n_2}, \; B \equiv \frac{n_2\sqrt{n_1^2-1}}{n_1\sqrt{n_2^2-1}} + \frac{n_1\sqrt{n_2^2-1}}{n_2\sqrt{n_1^2-1}}$$

and where Δω is said range of frequencies, c is the speed of light in air, $n_1$ is the index of refraction of a first layer of said two layers, $d_1$ is the thickness of said first layer, $n_2$ is the index of refraction of a second layer of said two layers, $d_2$ is the thickness of said second layer, and $a=d_1+d_2$.

36. The method of claim 32, wherein the layer thickness of materials of first and second layers with respective indices of refraction defined with respect to the ambient are chosen such that Δω is greater than zero.

37. The method of claim 27, wherein said structure is configured with a continuous variation in refractive index.

38. The method of claim 27, wherein said structure is configured as an aperiodic dielectric structure.

39. The method of claim 27, wherein the omnidirectional achieved is greater than 99%.

40. A method for producing an all dielectric omnidirectional reflector which exhibits oenidirectional reflection that is greater than 95% for a predetermined range of frequencies of incident electromagnetic energy of any angle of incidence and any polarization comprising:

providing a structure with a surface and a refractive index variation along the direction perpendicular to the said surface while remaining nearly uniform along the surface, said surface configured such that (i) a range of frequencies exists defining a reflectivity range which is higher than 99% for electromagnetic energy incident along the perpendicular direction of the said surface, (ii) a range of frequencies exists defining a reflectivity range which is higher than 99% for electromagnetic energy incident a direction approximately 90° from the perpendicular direction of the said surface, and (iii) a range of frequencies exists which is common to both of said reflectivity ranges.

41. The method of claim 40, wherein the reflectivity is greater than 96%.

42. The method of claim 40, wherein the reflectivity is greater than 97%.

43. The method of claim 40, wherein the reflectivity is greater than 98%.

44. The method of claim 40, wherein the reflectivity is greater than 99%.

* * * * *